(12) United States Patent
Wu et al.

(10) Patent No.: US 10,432,105 B2
(45) Date of Patent: Oct. 1, 2019

(54) POWER FREQUENCY CURRENT CONVERTER AND METHOD FOR CONTROLLING THE SAME

(71) Applicant: Delta Electronics, Inc., Taoyuan (CN)

(72) Inventors: Hongyang Wu, Taoyuan (CN); Weiqiang Zhang, Taoyuan (CN); Lizhi Xu, Taoyuan (CN); Wei Guan, Taoyuan (CN)

(73) Assignee: Delta Electronics, Inc., Taoyuan, Taiwan (CN)

( * ) Notice: Subject to any disclaimer, the term of this patent is extended or adjusted under 35 U.S.C. 154(b) by 142 days.

(21) Appl. No.: 14/993,189

(22) Filed: Jan. 12, 2016

(65) Prior Publication Data
US 2016/0276947 A1    Sep. 22, 2016

(30) Foreign Application Priority Data
Mar. 18, 2015    (CN) .......................... 2015 1 0119008

(51) Int. Cl.
*H02M 5/22* (2006.01)
*H02M 7/48* (2007.01)
(Continued)

(52) U.S. Cl.
CPC ............... *H02M 5/22* (2013.01); *H02M 7/48* (2013.01); *H02M 7/527* (2013.01);
(Continued)

(58) Field of Classification Search
CPC .......... H02M 5/22; H02M 7/48; H02M 7/527; H02M 5/27; H02M 5/271; H02M 5/293;
(Continued)

(56) References Cited

U.S. PATENT DOCUMENTS

| 9,641,085 B2 * | 5/2017 | Li ..................... H02M 3/33507 |
| 2004/0136208 A1 * | 7/2004 | Agarwal ............. H02M 1/4208 363/21.12 |

(Continued)

FOREIGN PATENT DOCUMENTS

| CN | 101056047 A | 10/2007 |
| CN | 102571043 A | 7/2012 |

(Continued)

OTHER PUBLICATIONS

1OA dated Apr. 11, 2017 by the JP Office.
(Continued)

*Primary Examiner* — Nguyen Tran
*Assistant Examiner* — Monica Mata
(74) *Attorney, Agent, or Firm* — Yunling Ren

(57) ABSTRACT

The present disclosure provides a power frequency current converter, including: an input side and an output side, wherein a current of the input side or the output side is a power frequency current; a switching device; and a controller, configured to control the switching device to be turned on and turned off at an operating frequency, wherein within a half of a power frequency cycle, the controller generates at least two fixed-frequency control signals and the operating frequency of the switching device alters at least twice according to the at least two fixed-frequency control signals, so as to reduce junction temperature of the switching device.

7 Claims, 18 Drawing Sheets

(51) Int. Cl.
*H02M 7/527* (2006.01)
*H02M 1/00* (2006.01)

(52) U.S. Cl.
CPC ............. *H02M 2001/0009* (2013.01); *H02M 2001/0048* (2013.01); *Y02B 70/1491* (2013.01)

(58) Field of Classification Search
CPC .. H02M 2001/0009; H02M 2001/0048; H03B 19/16; H01F 38/04; Y02B 70/1491
USPC ........................................................ 363/159
See application file for complete search history.

(56) References Cited

U.S. PATENT DOCUMENTS

2009/0278516 A1* 11/2009 Bhagwat ............ H02M 3/1588
                                                    323/270
2009/0279336 A1  11/2009 Erdman
2014/0334197 A1  11/2014 Zhao et al.

FOREIGN PATENT DOCUMENTS

| | | |
|---|---|---|
| CN | 103269548 A | 8/2013 |
| CN | 103280964 A | 9/2013 |
| CN | 103780097 A | 5/2014 |
| CN | 104348451 A | 2/2015 |
| JP | H07298626 A | 11/1995 |
| JP | 9252581 A | 9/1997 |
| JP | 2001275393 A | 10/2001 |
| JP | 201355794 A | 3/2013 |
| WO | 2014/049779 A1 | 4/2014 |

OTHER PUBLICATIONS

EESR dated Oct. 20, 2016 by the EP Office.
The 1st office action issued in the counterpart CN application No. 201510119008.4 dated Feb. 13, 2018, by the SIPO.
The CN2OA issued by CNIPA dated Sep. 30, 2018.

* cited by examiner

POWER FREQUENCY CURRENT CONVERTER AND METHOD FOR CONTROLLING THE SAME

CROSS REFERENCE TO RELATED APPLICATIONS

This application is based upon and claims priority under 35 U.S.C. § 119 to Chinese Patent Applications No. 201510119008.4, filed on Mar. 18, 2015, the entire contents of which are incorporated herein by reference.

TECHNICAL FIELD

The present disclosure generally relates to the field of power supplies, and more particularly, to a power frequency current converter and a method for controlling the same.

BACKGROUND

With wider application range of power electronic converters, semiconductor switching devices are accordingly widely applied. The semiconductor switching devices mainly include Insulated Gate Bipolar Transistors (IGBTs), Metal-Oxide-Semiconductor Field-Effect Transistors (MOSFETs), Silicon carbide (SiC) MOSFETs, and the like.

In power electronic converters employing semiconductor switching devices, a big part of losses come from the losses of the semiconductor switching devices. The losses of a semiconductor switching device include switching losses and conduction losses. The switching losses of a semiconductor switching device are related to the switching frequency of the semiconductor switching device. The higher the switching frequency is, the larger the switching losses will be; and if the switching frequency is reduced, the switching losses will decline.

FIG. 1 shows a conventional inverter system. The system includes a half bridge circuit using IGBTs (composed of switching devices S1 and S2), an LC filter (including an inductor Lf and a capacitor Cf) and Direct Current (DC) side capacitors C1 and C2. FIG. 2 shows, when the inverter circuit operates under a rated load, waveforms of an output voltage Vout(t) and an output current Io(t), waveforms of a switching loss Ps1_sw (16 KHz) and a conduction loss Ps1_con of the switching device S1, and waveforms of a switching loss Ps2_sw (16 KHz) and a conduction loss Ps2_con of the switching device S2.

According to a transient loss when an IGBT is at 100% load (150 kVA), in conjunction with a thermal resistance model from the IGBT to a heat sink, a graph as shown in FIG. 3 may be obtained, which shows changes of junction temperature Tj of the IGBT along time. The temperature of a heat sink may be designed at 80° C., variation amount ΔTj of the junction temperature of the semiconductor device is 8.4° C., and the maximum junction temperature Tjmax is 127° C. When the inverter circuit overloads by 150% in a short period, the ΔTj may rise to 14° C. and the maximum junction temperature Tjmax may be 159° C. (as shown in FIG. 4).

The maximum value of the operating junction temperature of an IGBT usually has to be under 150° C. to avoid damage of the semiconductor chip due to overheat. Further, high ΔTj may produce heat stress which may cause cumulated deformation of bonding wires, and thereby the bonding wires may break at the connection point with Direct Bond Copper (DBC) or the semiconductor chip, to damage the connection, which leads to a damage of a semiconductor module. Thus, in the above inverter application, short-period overload may bring large challenges to heat dissipation and device life.

In order to make the maximum operating junction temperature of the semiconductor switching device not over 150° C. and the ΔTj small, conventional resolutions employ semiconductor switches of higher rated current or more effective heat dissipation designs, which may increase cost and volume of the whole system.

SUMMARY

According to a first aspect of the present application, there provides a power frequency current converter, including: an input side and an output side, wherein a current of the input side or the output side is a power frequency current; a switching device; and a controller, configured to control the switching device to be turned on and turned off at an operating frequency, wherein within a half of a power frequency cycle, the controller generates at least two fixed-frequency control signals and the operating frequency of the switching device alters at least twice according to the at least two fixed-frequency control signals.

According to a second aspect of the present application, there provides a method for controlling a power frequency current converter according to the first aspect of the present application, including: controlling the power frequency current converter, to make the switching device in the converter, within a half cycle of the power frequency current, operate under a PWM mode at at least two different fixed operating frequencies.

According to a third aspect of the present application, there provides a power frequency current converter, wherein a power frequency current flows in or flows out the power frequency current converter, including: a switching device; and a PWM controller, configured to control the switching device to be turned on and turned off with a PWM mode, wherein at a first stage of a half of a power frequency cycle of the power frequency current, the switching device operates at a first fixed frequency according to the PWM controller, and at a second stage of the half of the power frequency cycle of the power frequency current, the switching device operates at a second fixed frequency according to the PWM controller.

DETAILED DESCRIPTION

Figure 5:
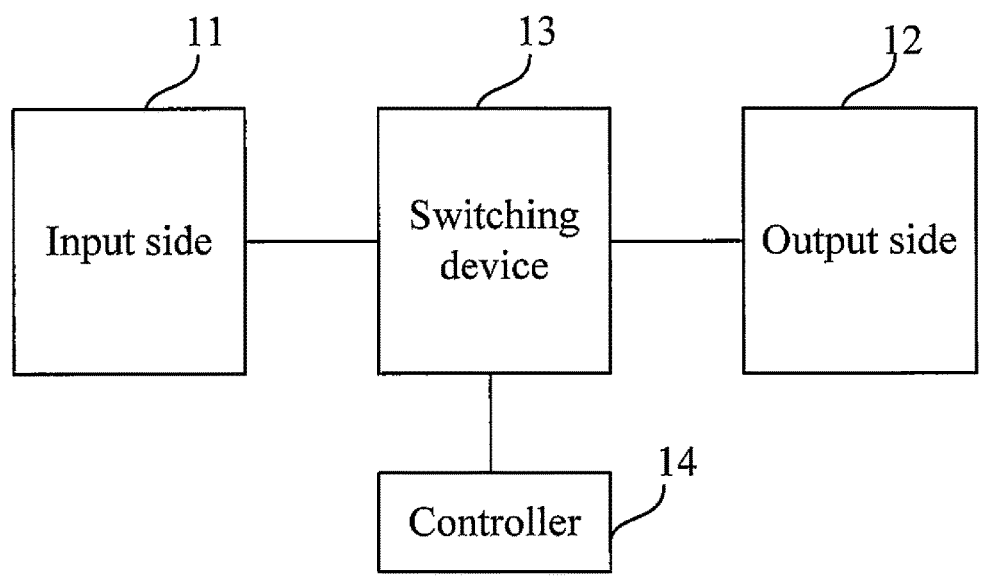
FIG. 5 shows a block diagram of a power frequency current converter according to an exemplary embodiment of the present disclosure.

FIG. 5 shows a block diagram of a power frequency current converter according to an exemplary embodiment of the present disclosure.

The power frequency current converter has an input side 11 and an output side 12. The currents flowing through the input side 11 or the output side 12 are power frequency currents. The power frequency current converter may be a device for converting an input current into a desired output current, such as a rectifier or an inverter. The input side 11 may for example include passive elements, such as capacitors or inductors. The output side 12 may for example include passive elements, such as capacitors or inductors. However, the invention is not limited thereto.

The power frequency current converter further includes a switching device 13 and a controller 14. The switching device 13 is configured to realize current conversion. For example, the switching device may include at least one semiconductor switching device such as an IGBT, a MOSFET, or a SiC MOSFET, but the invention is not limited thereto.

The controller 14 generates a control signal that controls on and off of the switching device 13. The controller 14 may generate at least two kinds of fixed control signals having different frequencies that make the operating frequency (i.e., switching frequency) of the switching device 13 alter at least twice according to the two fixed control signals within a half of a power frequency cycle, so as to reduce junction temperature of the switching device. But the invention is not limited thereto, for example, the two fixed control signals may be obtained by one stage-varied control signal and it can be seen as two fixed control signals. The controller may be a PWM (Pulse-Width Modulation) controller, so during a first fixed-frequency stage, the switching device is controlled to operate under PWM mode at a first fixed frequency, and during a second fixed-frequency stage, the switching device is controlled to operate under PWM mode at a second fixed frequency.

The power frequency may be 50 Hz or 60 Hz, and all the operating fixed frequencies of the switching device may be over 2 kHz, but the invention is not limited thereto.

Figure 1:
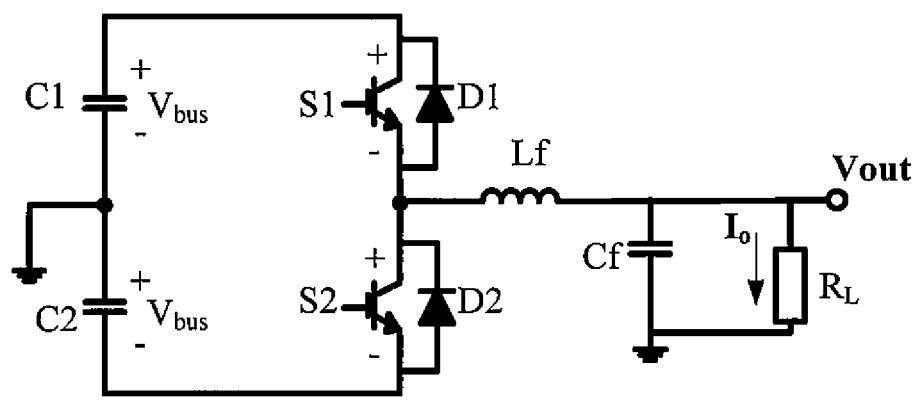
FIG. 1 shows a schematic diagram of a conventional inverter system.
Figure 2:
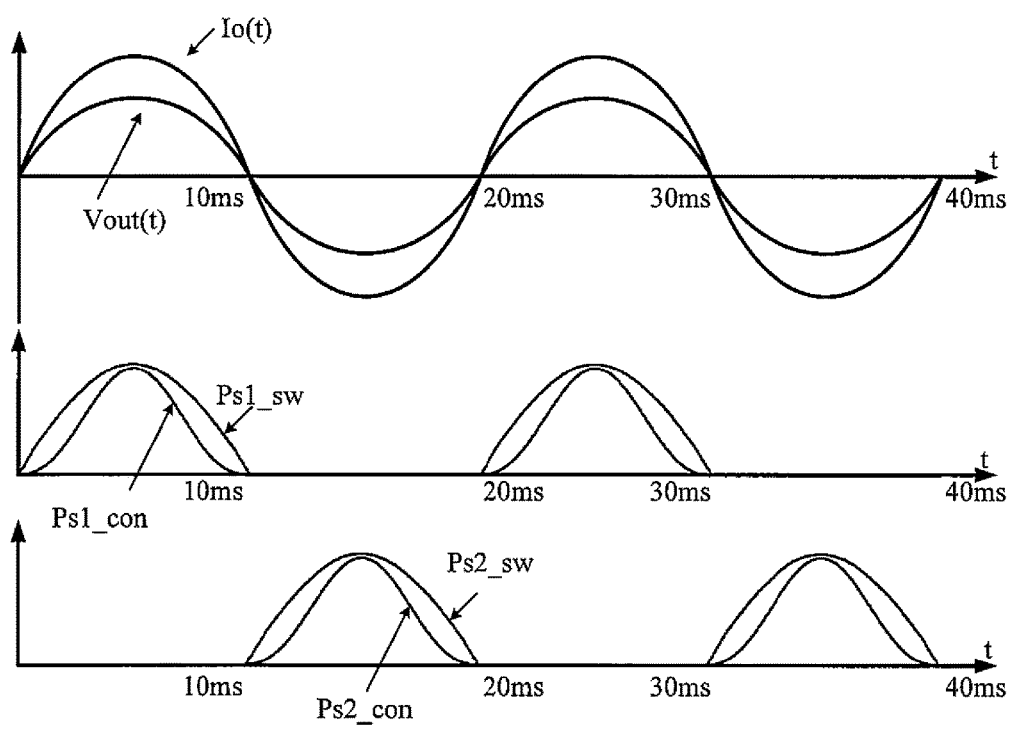
FIG. 2 shows, when the inverter circuit in FIG. 1 operates under a rated load, waveforms of an output voltage Vout(t) and an output current Io(t) waveforms of a switching loss Ps1_sw (16 KHz) and a conduction loss Ps1_con of the switching device S1, and waveforms of a switching loss Ps2_sw (16 KHz) and a conduction loss Ps2_con of the switching device S2
Figure 3:
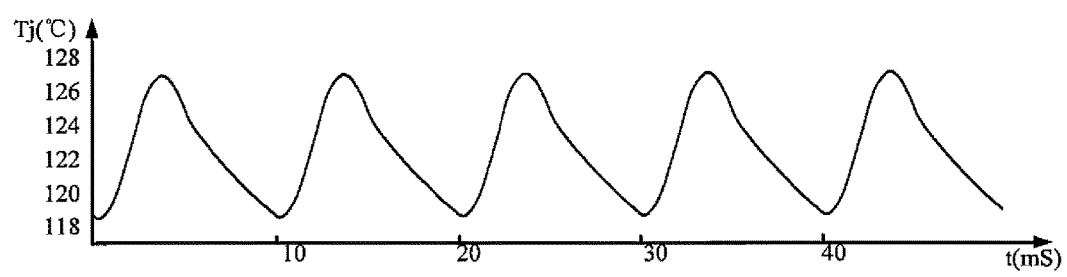
FIG. 3 shows changes of junction temperature Tj of an IGBT along time.
Figure 4:
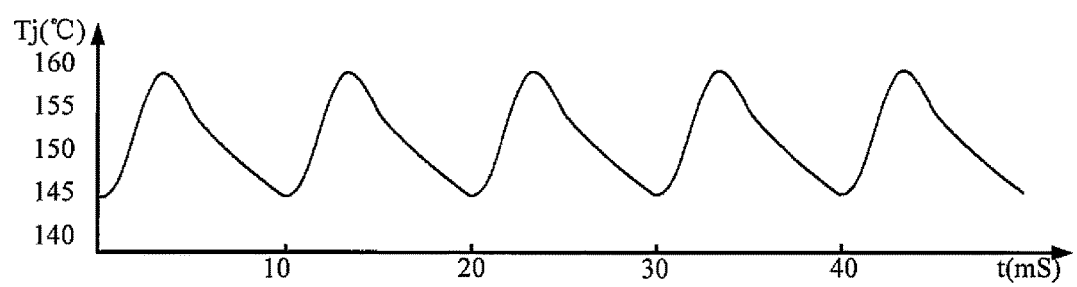
FIG. 4 shows variation amount of the junction temperature and the maximum junction temperature when the inverter circuit overloads by 150% in a short period.

Taking the topology shown in FIG. 1 as an example, in an exemplary embodiment of the present disclosure, the controller may generate at least two kinds of fixed control signals having different frequencies that make the operating frequency of the switching device alter twice according to the two fixed control signals within a half of a power frequency cycle, but the invention is not limited thereto, for example, a programmed control signal may lead to two or more different fixed frequencies and it can be seen as two or more fixed control signals. Thus, the switching loss of the switching device is distributed more evenly within a power frequency cycle, the whole loss is reduced, and the maximum operating junction temperature and the variation amount of the operating junction temperature of the switching device may be reduced. Thus, the heat dissipation challenge imposed on the power frequency current converter may be reduced and the service life of the converter may be extended. Further, semiconductor switches of higher rated current or more effective heat dissipation designs may not be needed, thereby cost or volume of the converter may not increase.

For convenience in description, the two kinds of fixed control signals having different frequencies are named as a first control signal and a second control signal. It is assumed that the frequency of the first control signal is larger than the frequency of the second control signal. Accordingly, within a half of a power frequency cycle, when the second control signal controls the switching device, the power frequency current at a second fix frequency is larger than that at a first fixed frequency when the first control signal controls the switching device.

Implementations of controllers in several power frequency current converters are listed in the following description, which are used for explaining how the operating frequency of the switching device alter between the two kinds of fixed control signals having different fixed frequencies within a half cycle of the power frequency current. However, the protection scope of the present disclosure is not limited to the embodiments set forth herein.

The First Embodiment

Figure 6:
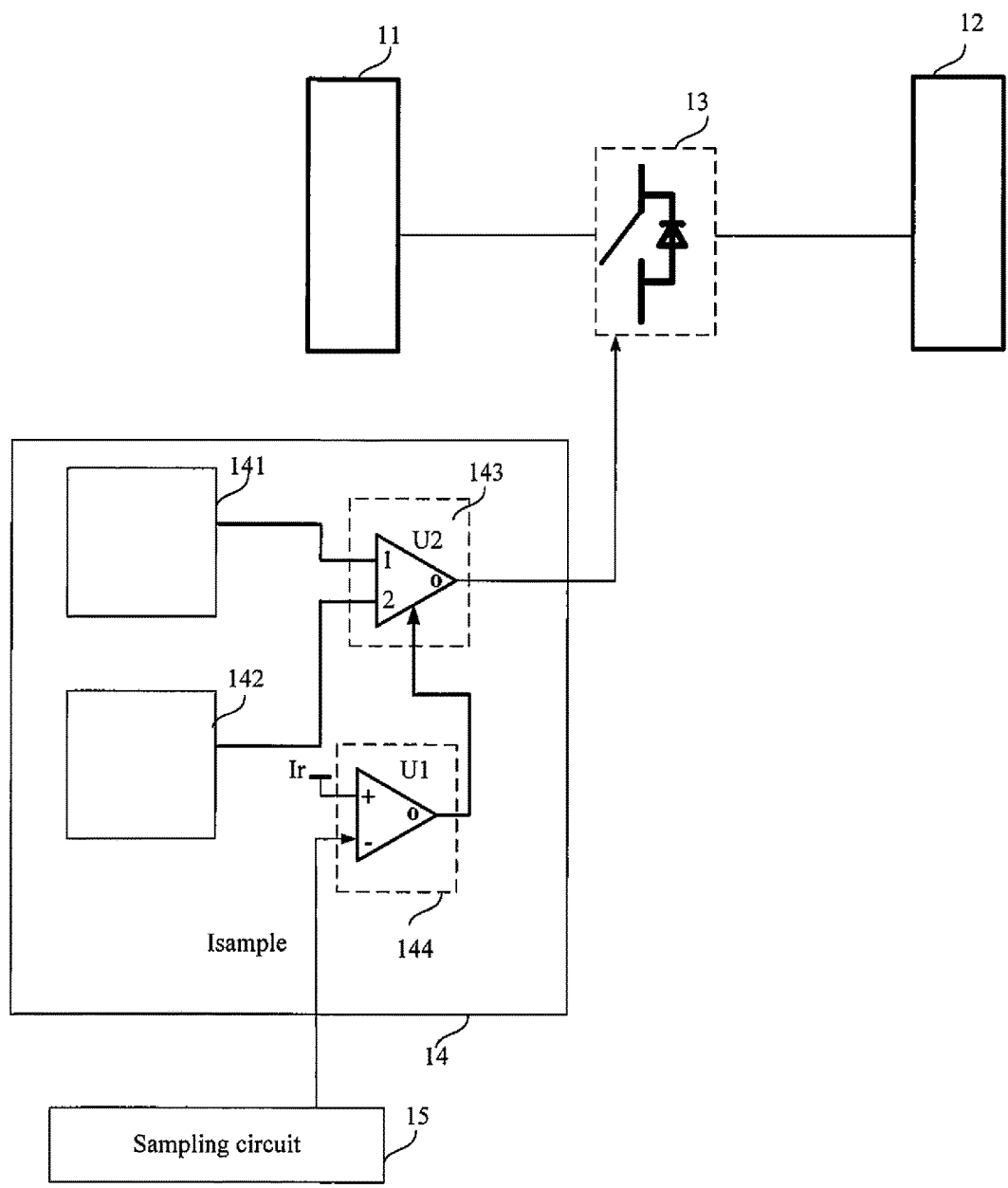
FIG. 6 shows a block diagram of a power frequency current converter according to an exemplary embodiment of the present disclosure.

In this embodiment, the first control signal and the second control signal may be realized by two fixed-frequency generators, as shown in FIG. 6. FIG. 6 shows a block diagram of a power frequency current converter according to an exemplary embodiment of the present disclosure. The controller may include a first frequency generator 141, a second frequency generator 142 and a selection circuit 143. The first frequency generator 141 may generate a first control signal, the second frequency generator 142 may generate a second control signal, and a frequency fA of the first control signal is larger than a frequency fB of the second control signal. Specifically, when the power frequency current of the switching device 13 is relatively large, the selection circuit 143 may select the second control signal to control the switching device 13; and when the power frequency current of the switching device 13 is relatively small, the selection circuit 143 may select the first control signal to control the switching device 13.

The power frequency current converter may further include a sampling circuit 15. The sampling circuit 15 samples the power frequency current and outputs a sampling current, but the invention is not limited thereto, for example, the sampling circuit 15 may output a signal representing the sampling current and the signal may be a voltage signal, a current signal or signals in other forms. The controller 14 may further include a judgment and comparison module 144. The judgment and comparison module 144 receives a sampling current signal Isample which is output from the sampling circuit 15 and a reference current signal Ir, and the judgment and comparison module 144 judges the comparison results according to the sampling current signal Isample and the reference current signal Ir. The controller 14 outputs the first control signal or the second control signal according to the comparison results. Specifically, when the power frequency current is relatively large, i.e., when Isample≥Ir, the selection circuit 143 selects to output the second control signal of the second frequency generator 142 to the switching device 13, so the power frequency current converter can operate under a relatively low fixed-frequency; and when the power frequency current is relatively small, i.e., when Isample<Ir, the selection circuit 143 selects to output the first control signal of the first frequency generator 141 to the switching device 13, so the power frequency current converter can operate under a relatively high fixed-frequency.

For example, the judgment and comparison module 144 may be realized by a first comparator U1, the selection circuit 143 may be realized by a second comparator U2, and an output terminal of the first comparator U1 is connected to a control terminal of the second comparator U2. When Isample≥Ir, the first comparator U1 may output a low level signal, so that the second comparator U2 uses the second control signal provided by the second frequency generator 142 which connects to a second input terminal 2 of the second comparator U2 as the control signal to be output to the switching device 13. When Isample<Ir, the first comparator U1 may output a high level signal, so that the second comparator U2 uses the first control signal provided by the first frequency generator 141 which connects to a first input terminal 1 of the second comparator U2 as the control signal to be output to the switching device 13. The sampling current signal Isample and the reference current signal Ir can be either current signal or voltage signal, the invention is not limited thereto.

For the converter shown in FIG. 6, two frequency generators are employed to generate at least two kinds of fixed control signals having different frequencies, but the invention is not limited thereto. For the power frequency current of a power frequency current converter, within a half cycle of the power frequency current, the current close to the peak has a relatively big magnitude and the current at both ends has a relatively small magnitude. Thus, in the embodiment, the switching device operates at the frequency of the first control signal at the starting stage of the half wave cycle, then the frequency of the switching device alters from the frequency of the first control signal to the frequency of the second control at a point between the starting stage and the peak, and when the power frequency current becomes small at the end stage of the half wave cycle, the frequency of the switching device alters from the frequency of the second control signal to the frequency of the first control signal. Thus, in the half wave cycle, the frequency of the switch device alters between the frequencies of the two control signals at least twice. Thus, the switching loss of the switching device is distributed more evenly within a power frequency cycle, the whole loss is reduced, and the maximum operating junction temperature and the variation amount of the operating junction temperature of the switching device are reduced.

The Second Embodiment

Figure 7:
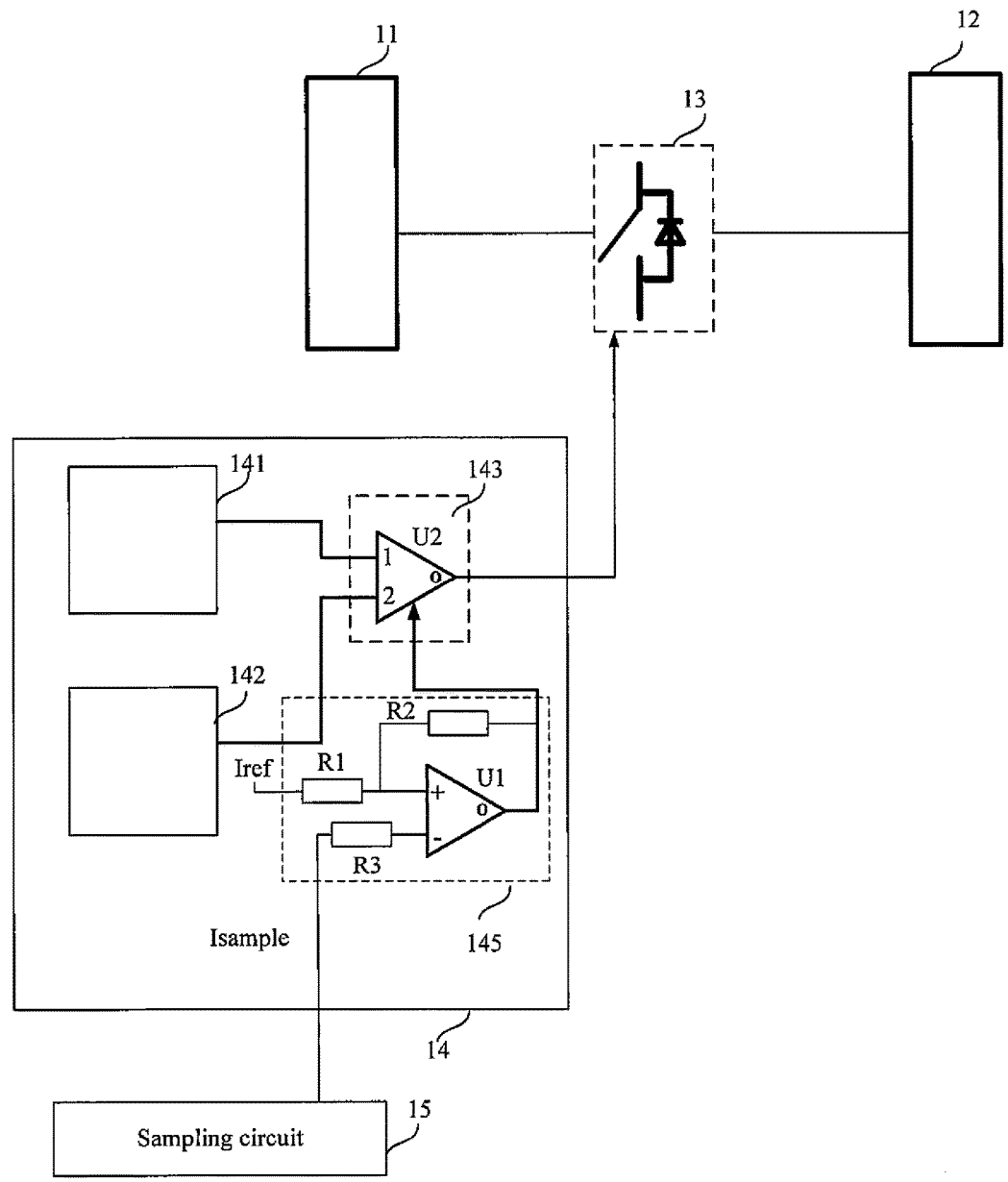
FIG. 7 shows a block diagram of a power frequency current converter according to an exemplary embodiment of the present disclosure.

FIG. 7 shows a block diagram of a power frequency current converter according to an exemplary embodiment of the present disclosure. In the embodiment, the controller includes a hysteresis comparison module 145 to replace the judgment and comparison module 144 in FIG. 6. The hysteresis comparison module 145 receives the sampling current signal Isample which is output from the sampling circuit 15, and further receives a first sub-reference current signal Iref1 and a second sub-reference current signal Iref2. The first sub-reference current signal Iref1 is larger than the second sub-reference current signal Iref2. The hysteresis comparison module 145 judges comparison results between the sampling current signal Isample and the first and second sub-reference current signals Iref1 and Iref2, and accordingly outputs the first control signal or the second control signal.

For example, the hysteresis comparison module 145 may include a first comparator U1, a first resistor R1, a second resistor R2 and a third resistor R3. A positive input terminal and a negative input terminal of the first comparator U1 are respectively connected to the first resistor R1 and the third resistor R3, and the second resistor R2 is connected between the positive terminal and the output terminal of the first comparator U1. The hysteresis control introduces two reference values:

$$Iref1 = UoH \times \frac{R1}{R1 + R2} + Iref \times \frac{R2}{R1 + R2},$$

$$Iref2 = Iref \times \frac{R2}{R1 + R2},$$

wherein UoH is the voltage of the output terminal of the first comparator U1, and Iref is a reference current signal input to the positive input terminal of the first comparator U1. The sampling current signal Isample, the reference current signal Iref, the first sub-reference current signal Iref1 and the second sub-reference current signal Iref2 can be either current signal or voltage signal, the invention is not limited thereto.

The output terminal of the first comparator U1 is connected to a control terminal of the second comparator U2, to make the second comparator U2 select to output the first control signal or the second control signal to the switching device.

Figure 8:
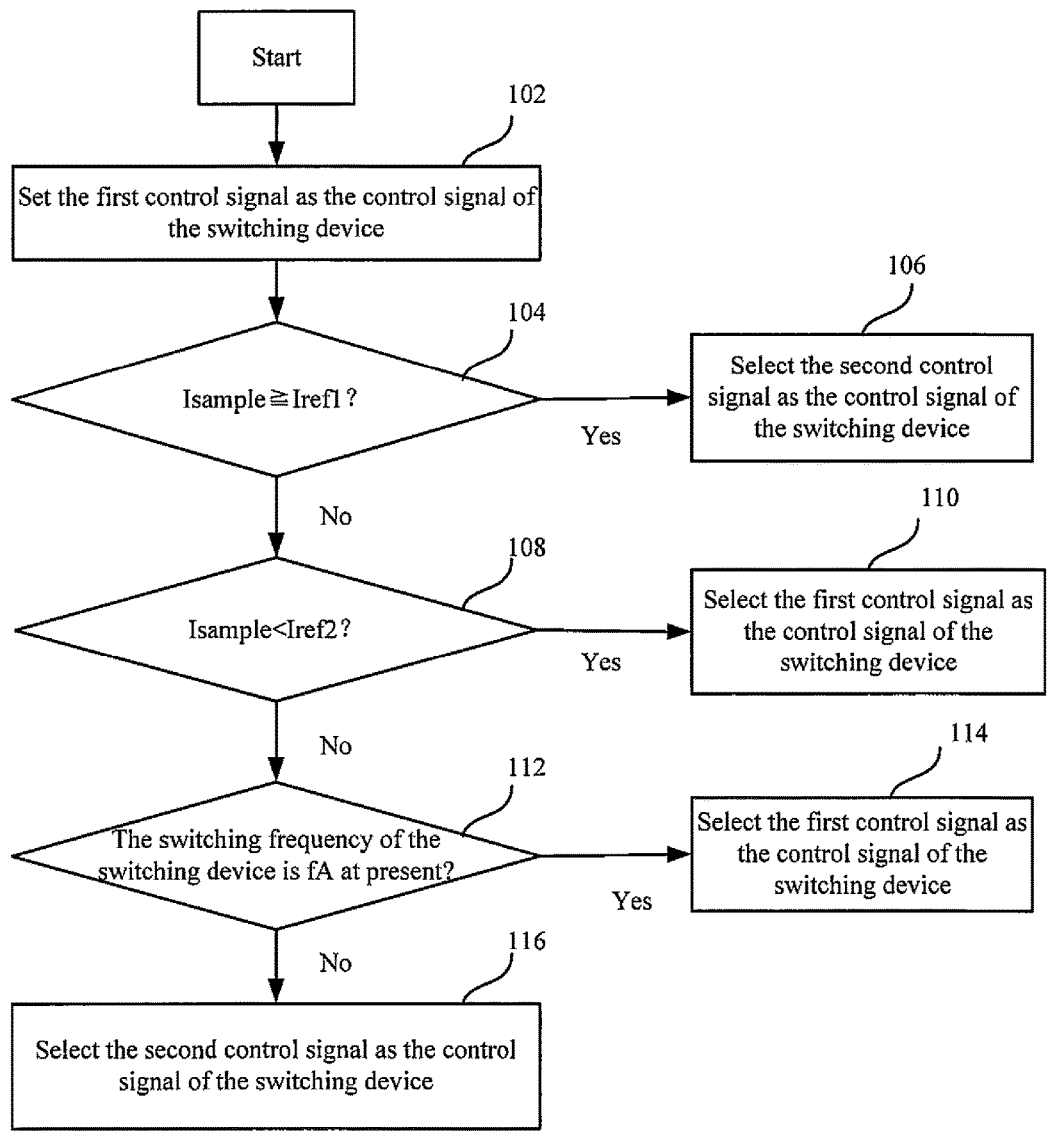
FIG. 8 shows a flowchart of a hysteresis control of FIG. 7.

FIG. 8 shows the specific procedure of the hysteresis control of the converter shown in FIG. 7.

In this embodiment, at the initial start, the first control signal is set as the control signal of the switching device. That is to say, the switching frequency of the switching device is the frequency fA of the first control signal (block 102).

During the sampling of the power frequency current, whether the sampling current signal Isample is larger than or equal to Iref1 (Isample≥Iref1) is judged (block 104). If the judgment result is yes, the procedure turns to block 106, thus the second control signal is selected as the control signal of the switching device, i.e., the switching frequency of the switching device is set as fB; otherwise, if the judgment result is no, the procedure turns to block 108.

At block 108, whether the sampling current signal Isample is smaller than Iref2 (Isample<Iref2) is judged. If the judgment result is yes, the procedure turns to block 110, thus the first control signal is selected as the control signal of the switching device, i.e., the switching frequency of the switching device is set as fA; otherwise, if the judgment result is no, the procedure turns to block 112.

At block 112, whether the switching frequency of the switching device is fA at present is judged. If the judgment result is yes, the procedure turns to block 114, thus the first control signal is selected as the control signal of the switching device, i.e., the switching frequency of the switching device is set as fA at present; otherwise, if the judgment result is no, the procedure turns to block 116, thus the second control signal is selected as the control signal of the switching device, i.e., the switching frequency of the switching device is set as fB at present.

However, the invention is not limited thereto, for example, the block 102 may be omitted, the block 104 and the block 106 may be combined, and sequence of the blocks may be re-arranged.

The Third Embodiment

Figure 9:
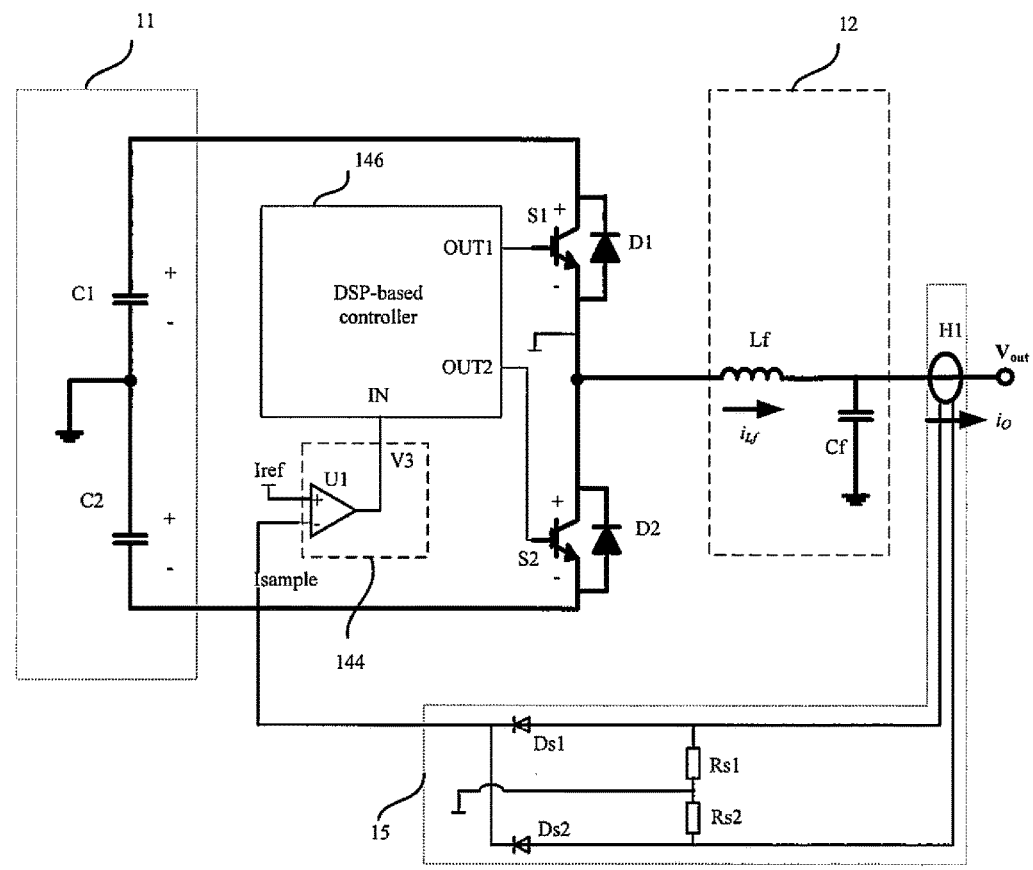
FIG. 9 shows a schematic diagram of a power frequency current converter according to an exemplary embodiment of the present disclosure.

FIG. 9 shows a schematic diagram of a power frequency current converter according to an exemplary embodiment of the present disclosure. The power frequency current converter is a power frequency inverter, in this embodiment, the current flowing through the output side is a power frequency current.

The input side 11 includes capacitors C1 and C2. An inductor Lf and a capacitor Cf are applied in the output side 12. The semiconductor device includes a half bridge switching circuit composed of IGBT type switches S1 and S2. The sampling circuit 15 shown in FIG. 9 includes a Hall element H1, sampling resistors Rs1 and Rs2 and rectifying diodes Ds1 and Ds2. The judgment and comparison module 144 includes the first comparator U1. The above-mentioned first frequency generator, the second frequency generator and the selection circuit may be implemented by a DSP (digital Signal Processor)-based controller 146.

As shown in FIG. 9, the Hall element H1 in the sampling circuit 15 samples the output power frequency load current io, and the sampling current generates a corresponding current feedback signal through the resistors Rs1 and Rs2. The current feedback signal is rectified by the diodes Ds1 and Ds2, thereby an absolute value of the sampling signal of the load current, Isample, is obtained, but the invention is not limited thereto. The absolute current value Isample is compared with the reference current signal Iref. If Isample<Iref, the comparator U1 outputs a high level signal, and if Isample≥Iref, the comparator U1 outputs a low level signal, but the invention is not limited thereto. The output terminal of the comparator U1 is connected to an input terminal of the DSP-based controller 146. The DSP-based controller 146 selects a corresponding switching frequency according to the input signal, to drive the semiconductor switches S1 and S2.

Specifically, in one embodiment, if the input signal (i.e., the signal input to the input terminal IN) of the DSP-based controller 146 is at a high level, the relatively high switching frequency fA is selected as the switching frequencies of the switching devices S1 and S2, that is to say, the first control signal is selected as the control signals of the switching devices S1 and S2; if the input signal of the DSP-based controller 146 is at a low level, a relatively low switching frequency fB is selected as the switching frequencies of the switching devices S1 and S2, that is to say, the second control signal is selected as the control signals of the switching devices S1 and S2, but the invention is not limited thereto.

It shall be noted that the half bridge circuit in the embodiment may be replaced by circuits having other topologies such as a full-bridge topology, a three-level circuit topology, et al. The switches S1 and S2 may be obtained by several IGBTs connected in series or in parallel, or may be MOSFETs, or SiC MOSFETs, et al. Besides adopting a Hall element, the sampling may adopt methods such as sampling resistors connected in series, a current transformer or a Rogowski coil. Besides provided by internal timers of the DSP-based controller, the switching frequency generators may be implemented by constructing a voltage-controlled oscillator or a crystal oscillator externally, etc. However, the present disclosure is not limited to the examples set forth herein.

Figure 10:
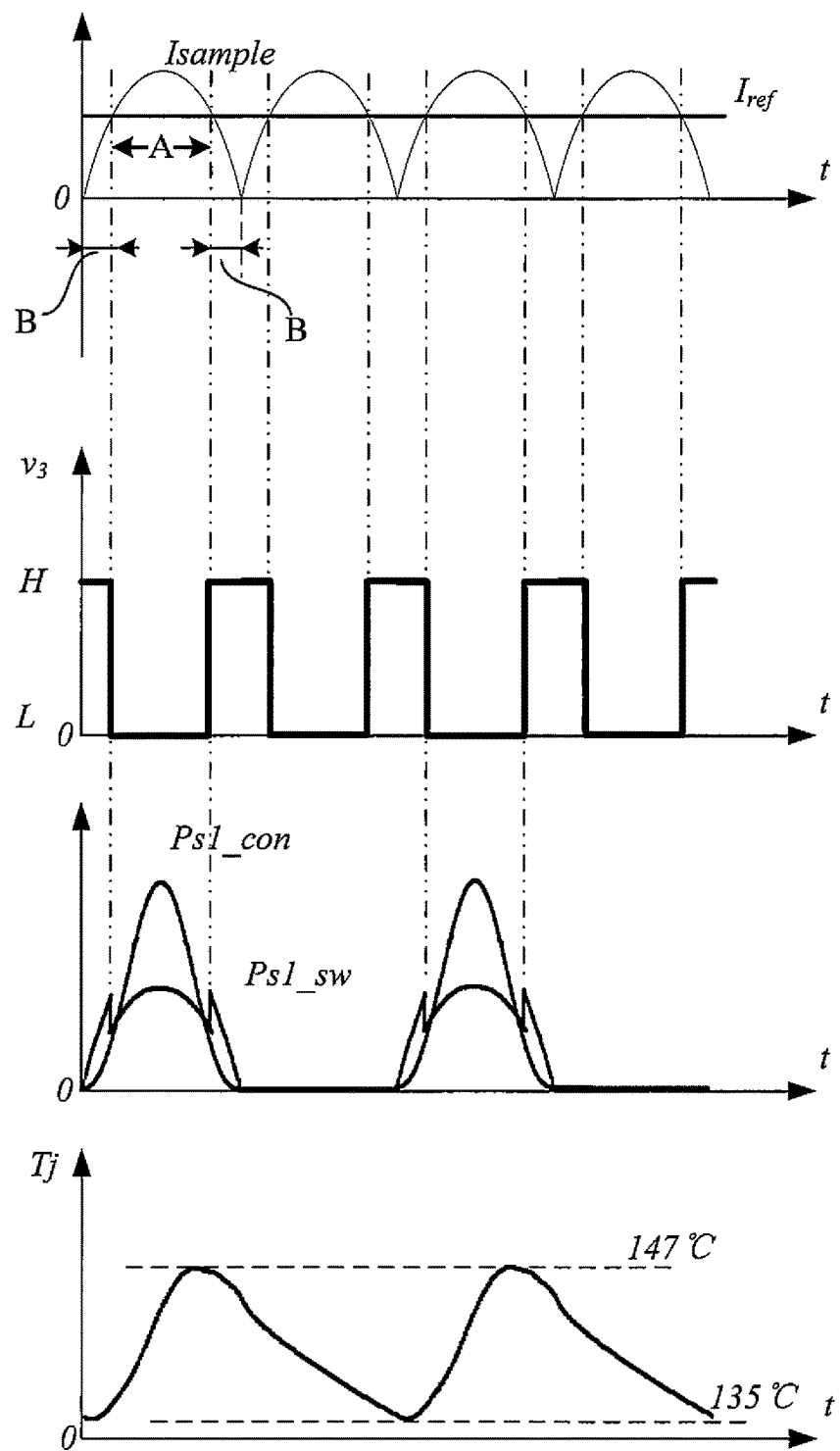
FIG. 10 shows corresponding waveforms of the system of FIG. 9.

FIG. 10 shows corresponding waveforms of the system shown in FIG. 9. When the sampling current signal Isample is smaller than Iref, the output voltage v3 of the first comparator U1 is at a high level, the switching frequencies of the IGBTs are set as a relatively high switching frequency fA (for example, 16 kHz). If the sampling current signal Isample is larger than Iref, the output voltage v3 of the first comparator U1 is at a low level, the switching frequencies of the IGBTs are set as a relative low switching frequency fB (for example, 10 kHz), thus the switching losses are reduced. FIG. 10 gives the graphs of the switching losses and the conduction losses of the switch S1 and the graph of the operating junction temperature of the switch S1. At this time, the maximum junction temperature of the switch S1 is 147° C. (the junction temperature is reduced by 12° C., compared with the initial junction temperature), and the variation amount of the junction temperature is 12° C. (the variation amount of the junction temperature is reduced by 2° C., compared with the initial variation amount of the junction temperature). A total loss of conduction loss Ps1_con and switching loss Ps1_sw is more even.

Figure 11:
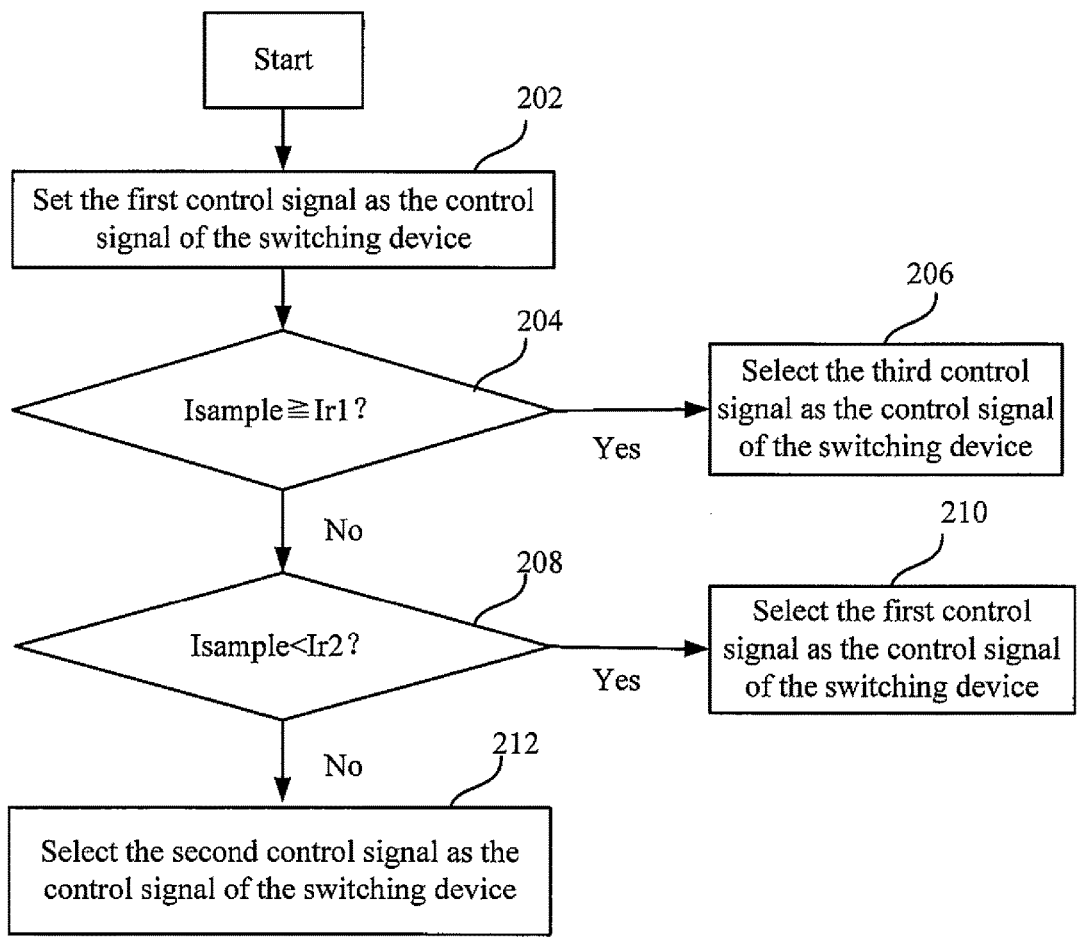
FIG. 11 shows a control flowchart in an example wherein three kinds of switching frequencies are employed.

Further, in other embodiments, three kinds of fixed switching frequencies may be employed within a half of a power frequency cycle for operation. The flowchart of this method is shown in FIG. 11.

At the initial start, the first control signal is set as the control signal of the switching device. That is to say, the switching frequency of the switching device is the frequency fA of the first control signal (block 202).

During the sampling of the power frequency current, whether the sampling current signal Isample is larger than or equal to the first reference current signal Ir1 (Isample≥Ir1) is judged (block 204). If the judgment result is yes, the procedure turns to block 206, thus the third control signal is selected as the control signal of the switching device. That is to say, the switching frequency of the switching device is set as fC. If the judgment result is no, the procedure turns to block 208.

At block 208, whether the sampling current signal Isample is smaller than the second reference current signal Ir2 (Isample<Ir2) is judged. If the judgment result is yes, the procedure turns to block 210, thus the first control signal is selected as the control signal of the switching device, that is to say, the switching frequency of the switching device is set as fA. If the judgment result is no, the procedure turns to block 212, thus the second control signal is selected as the control signal of the switching device, that is to say, the switching frequency of the switching device is set as fB at present (fA>fB>fC).

However, the invention is not limited thereto, for example, the block 202 may be omitted, the block 204 and the block 208 may be combined, and sequence of the blocks may be re-arranged.

It shall be noted that, in the flowchart shown in FIG. 11, the first reference current signal Ir1 and the second reference current signal Ir2 differ from the first sub-reference current signal Iref1 and the second sub-reference current signal Iref2 described in the embodiment of FIG. 7. The reference current signals Ir1 and Ir2 are two reference current signals employed for realizing switching among three frequencies within a half of the power frequency cycle, while the sub-reference current signals Iref1 and Iref2 are two reference current signals introduced because of the hysteresis control.

Figure 12:
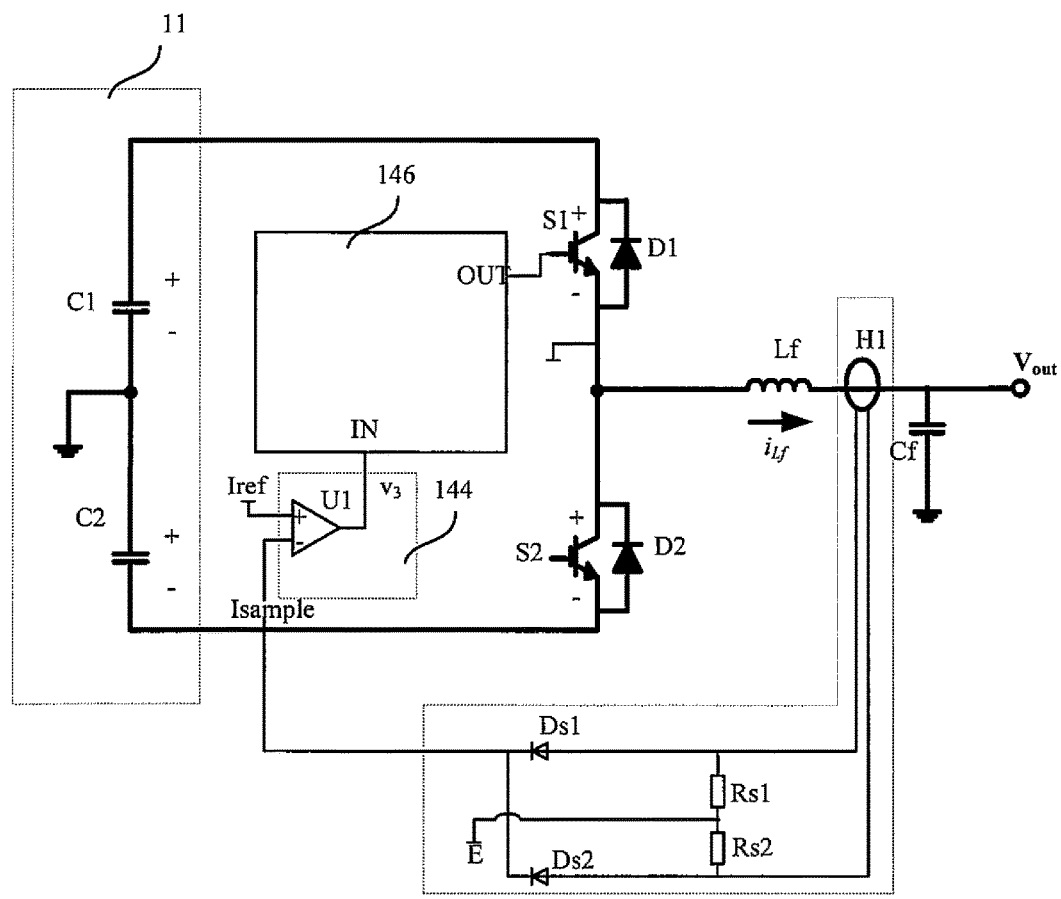
FIG. 12 shows a schematic diagram of a power frequency current converter according to an exemplary embodiment of the present disclosure.

FIG. 12 shows a schematic diagram of a power frequency current converter according to an exemplary embodiment of the present disclosure. The power frequency current converter is an inverter. The present embodiment differs from the embodiment of FIG. 9 in that the sampled signal of FIG. 12 is different from that of FIG. 9. As shown in FIG. 12, the converter samples the current of the output filter inductor by a Hall element H1.

In order to avoid the influence of high frequency ripple on the output voltage v3 of the comparator U1, the judgment and comparison part in FIG. 12 may be implemented by the hysteresis control shown in FIG. 7.

Figure 13:
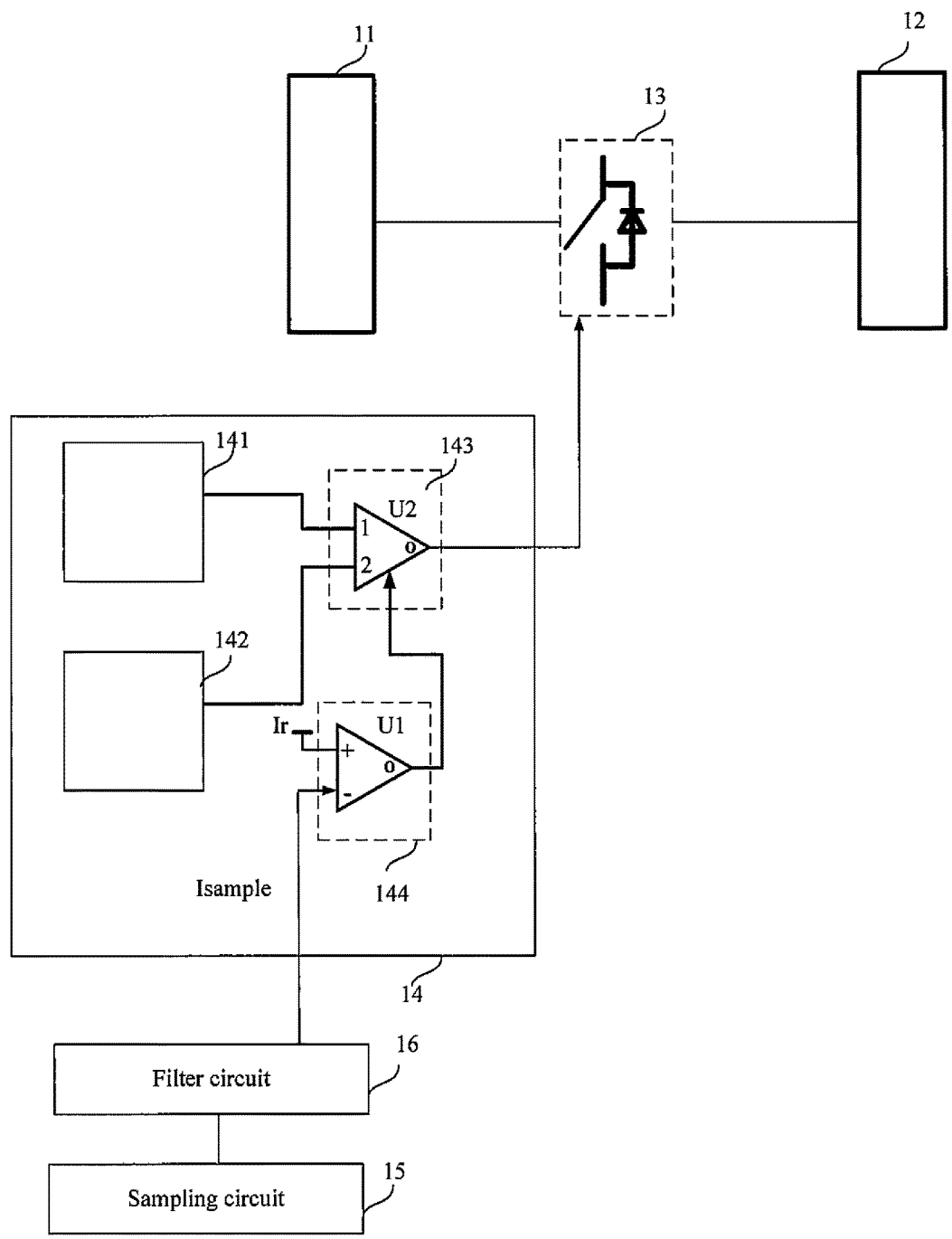
FIG. 13 shows a block diagram of a power frequency current converter according to an exemplary embodiment of the present disclosure.

FIG. 13 shows a block diagram of a power frequency current converter according to an exemplary embodiment of the present disclosure. This embodiment differs from the embodiment of FIG. 6 in the addition of a filter circuit 16. The filter circuit 16 filters interference signals from the sampling current signal sampled by the sampling circuit 15.

For the power frequency current converters shown in FIGS. 7, 9 and 12, the filter circuit may also be added to filter the interference signals from the sampling current signal.

Figure 14:
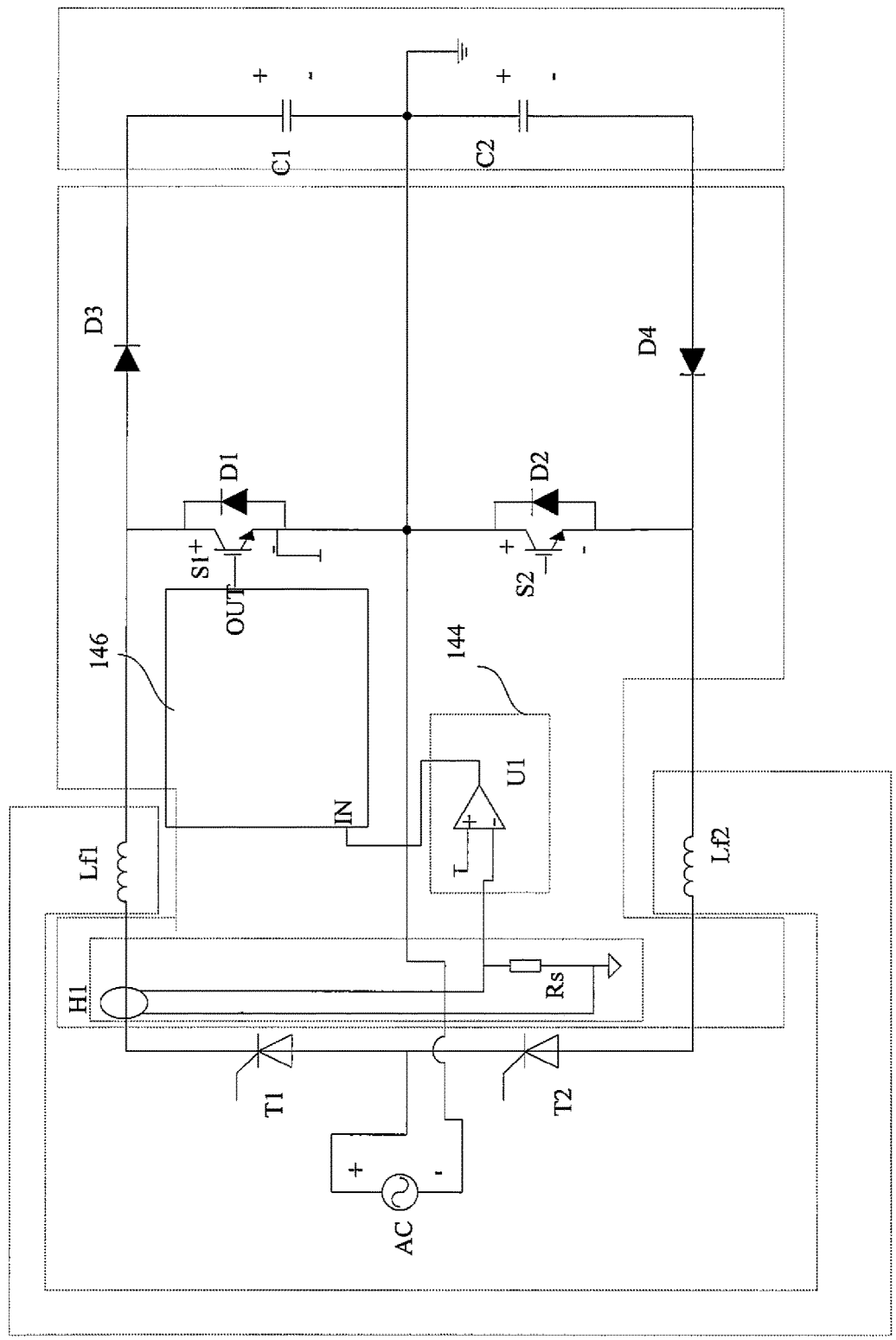
FIG. 14 shows a schematic diagram of a power frequency current converter according to an exemplary embodiment of the present disclosure.

FIG. 14 shows a block diagram of a power frequency current converter according to an exemplary embodiment of the present disclosure. The power frequency current converter is a rectifier, in this embodiment, the current flowing through the input side is a power frequency current. The positive half cycle voltage of the AC power supply is rectified by a thyristor T1 and output to an inductor Lf1, the negative half cycle voltage is rectified by a thyristor T2 and output to an inductor Lf1. The inductor Lf1, a switch S1 and a diode D3 are applied in a PFC (Power Factor Correction) circuit for realizing the power factor correction function on the positive half cycle voltage of the AC power supply. The inductor Lf2, the switch S2 and the diode D4 are applied in a PFC circuit for realizing the power factor correction function on the negative half cycle voltage of the AC power supply. Capacitors C1 and C2 are filtering capacitors for reducing the ripples in the DC side voltage. The capacitors C1 and C2 are applied in the output side. The semiconductor switches may include IGBT type switches S1 and S2. The Hall element H1 and the sampling resistor Rs are applied in a sampling circuit. The comparator U1 is applied in the judgment and comparison module, and the DSP-based controller 146 is applied in the selection circuit.

As shown in the figure, the Hall element H1 samples the current flowing through the sampling inductor Lf1, the sampling current generates a corresponding current feedback signal through the resistor Rs. The current feedback signal is a DC signal, so no rectifying process for the current feedback signal is needed. The current feedback signal Isample is compared with Iref by the comparator U1; if Isample<Iref, the comparator U1 outputs a high level signal.

If Isample≥Iref, the comparator U1 outputs a low level signal, but the invention is not limited thereto. The output terminal of the comparator U1 is connected to the input terminal of the DSP-based controller 146. The DSP-based controller 146 selects a corresponding switching frequency according to the input signal, to drive the semiconductor switches S1 and S2. Detailed control flowchart may be the same as the previously-described embodiments.

It shall be noted that the rectifying circuit in the present embodiment may be replaced by circuits having other topologies. The switches S1 and S2 may be obtained by several IGBTs connected in parallel or in series, or may be MOSFETs, or SiC MOSFETs, et al. The sampled current signal may be current flowing through the IGBT type switches S1 and S2. Besides adopting a Hall element, the sampling may adopt methods such as sampling resistors connected in series, a current transformer or a Rogowski coil.

Figure 15:
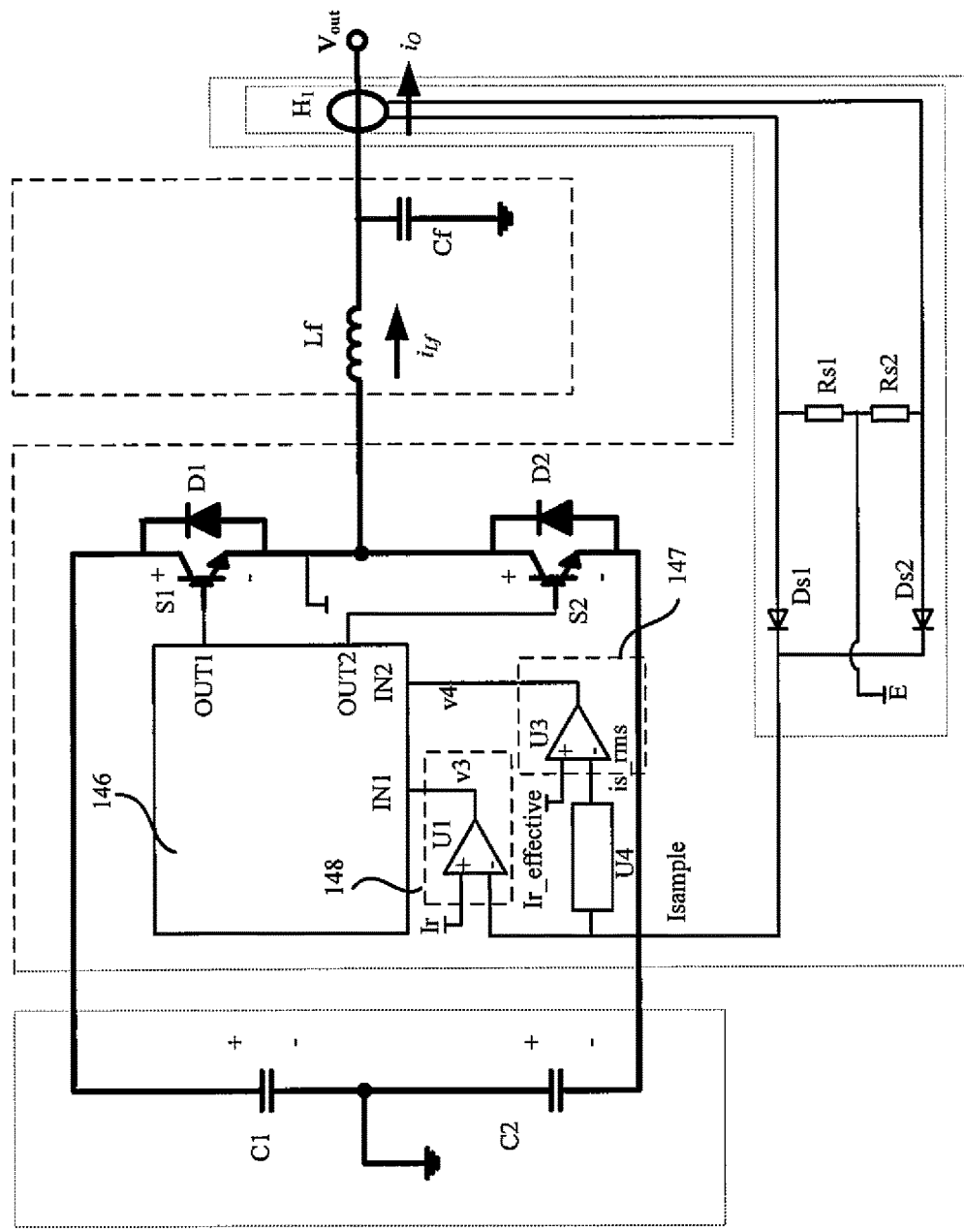
FIG. 15 shows a schematic diagram of a converter according to an exemplary embodiment of the present disclosure.

FIG. 15 shows a schematic diagram of a power frequency current converter according to an exemplary embodiment of the present disclosure. In the embodiment, both a present value of the sampling current and an RMS (Root-Mean-Square) value of the sampling current can be obtained according to the sampling current signal. The controller includes a first judgment and comparison module 147 and a second judgment and comparison module 148. The first judgment and comparison module 147 receives an RMS value reference current signal and the RMS value signal of the sampling current, and the second judgment and comparison module 148 receives a first reference current signal and the present value signal of the sampling current.

Compared with the embodiment shown in FIG. 14, a judgment condition, i.e., an RMS value judgment is added into the converter of the present embodiment. As shown in FIG. 15, a processed power frequency AC signal is rectified, then the sampling signal of the current, Isample (the sampling current signal Isample is the present value signal of the sampling current), is obtained. Besides the comparison between Isample and the reference current signal Ir by the comparator U1 (the comparator U1 is for example the second judgment and comparison module 148 in the present embodiment), RMS value information of the power frequency current, is_rms (i.e., the RMS value signal of the sampling current), is obtained by an RMS value computation module U4. Further, the comparator U3 (the comparator U3 is for example the first judgment and comparison module 147 in the present embodiment) compares is_rms with the RMS value reference current signal Ir_effective. If is_rms is larger than Ir_effective, the output signal v4 of the comparator U3 is at a low level, and if is_rms is smaller than or equal to Ir_effective, the output signal v4 of the comparator U3 is at a high level, but the invention is not limited thereto. The output signal v4 of the comparator U3 is output to the input terminal IN2 of the DSP-based controller 146.

Figure 16:
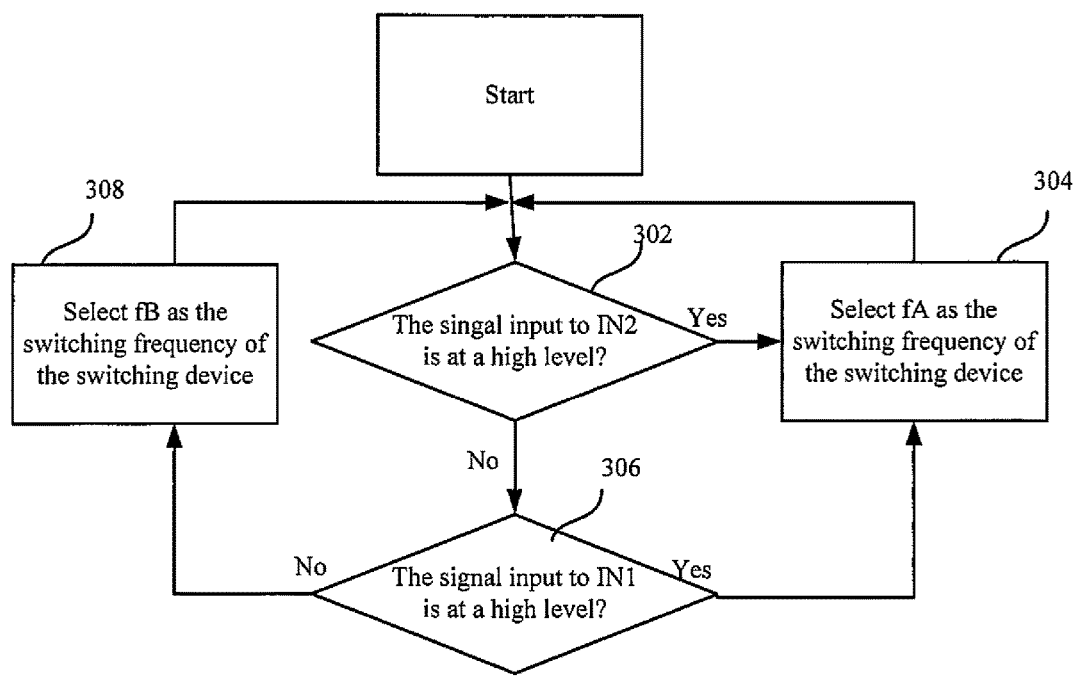
FIG. 16 shows a flowchart of an internal control of a DSP-based controller in the converter of FIG. 15.

An internal flowchart of the DSP-based controller 146 is shown in FIG. 16. Firstly, whether the signal input to the IN2 terminal is at a high level is judged (block 302). If the signal input to IN2 is at a high level, i.e., the RMS value signal of the sampling current is smaller than the RMS value reference current signal, the procedure turns to block 304, i.e., the switching frequency is not altered, thereby the switching frequency is kept at a relatively high frequency fA. If the signal input to IN2 is at a low level, i.e., the RMS value of the sampling current is larger than the RMS value reference current signal, the procedure turns to block 306. At block 306, whether the signal input to IN1 is at a high level is judged. If the signal input to IN1 is at a high level, i.e., the present value signal of the sampling current, Isample, is lower than the reference current signal Ir, the procedure turns to block 304, thus the switching frequency of the semiconductor switch is set as a relatively high switching frequency fA. If the signal input to IN1 is at a low level, i.e., the present value signal of the sampling current, Isample, is higher than the reference current signal Ir, the procedure turns to block 308, thus the switching frequency of the semiconductor switch is set as a relatively low switching frequency fB.

Figure 17:
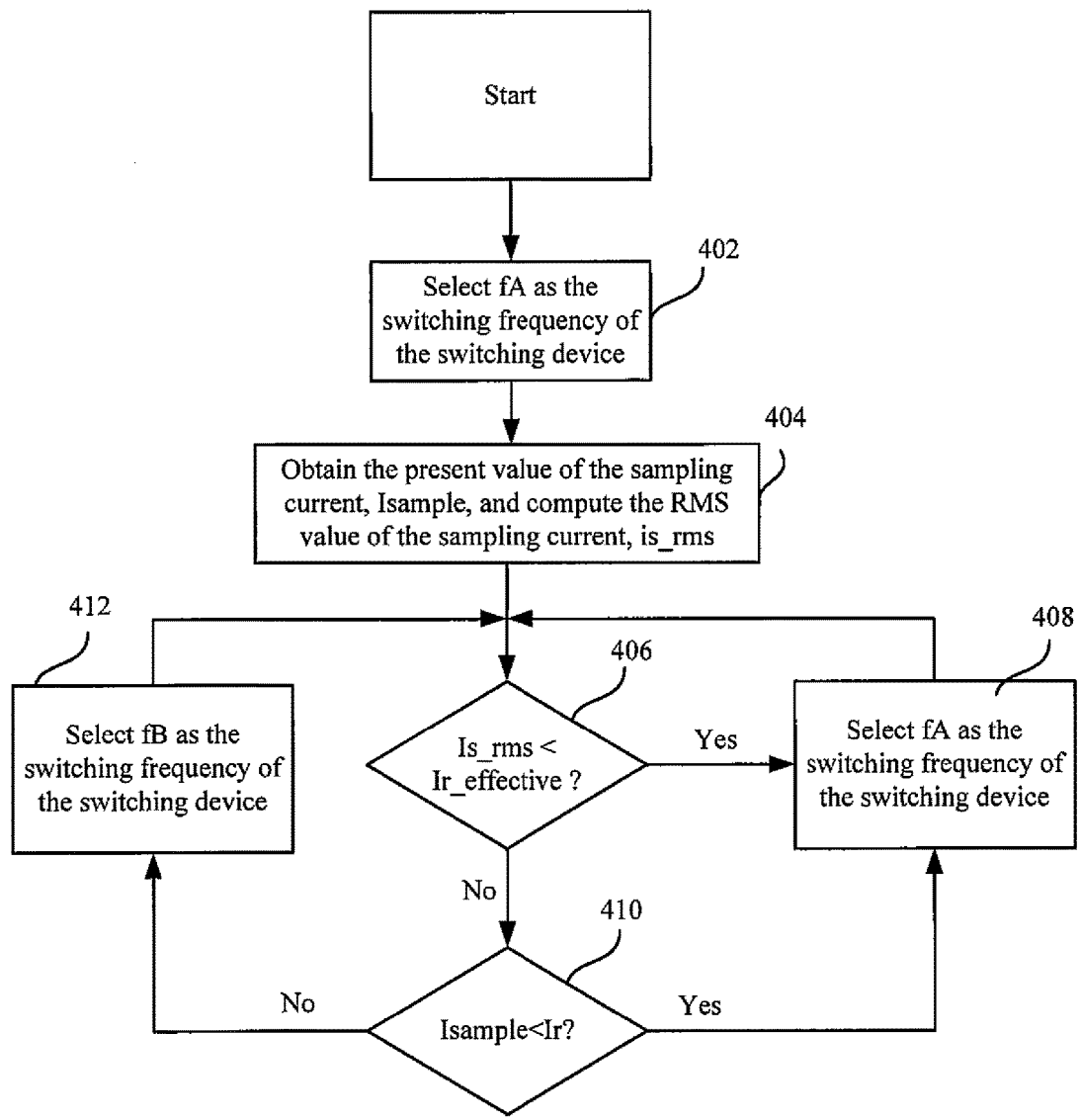
FIG. 17 shows a control flowchart of the converter of FIG. 15.

FIG. 17 shows a flowchart of a control method of the system shown in FIG. 15.

Firstly, the switching frequencies of the switches S1 and S2 in the converter are set as a relatively high switching frequency fA (block 402). Then, the converter samples the load current and processes the sampled current to obtain a current signal Isample, and computes an RMS value signal of Isample, is_rms (block 404). Whether is_rms is smaller than Ir_effective is judged (block 406). If is_rms is smaller than Ir_effective, the procedure turns to block 408, thus the switching frequencies of the switches S1 and S2 in the converter are set as a relatively high switching frequency fA. If is_rms is larger than or equal to If_effective, the procedure turns to block 410. At block 410, whether Isample is smaller than Ir is judged. If Isample is smaller than Ir, the procedure turns to block 408, thus the switching frequencies of the switches S1 and S2 in the converter are set as a relatively high switching frequency fA. If Isample is larger than or equal to Ir, the procedure turns to block 412, thus the switching frequencies of the switches S1 and S2 in the converter are set as a relatively low switching frequency fB.

However, the invention is not limited thereto, for example, the block 402 may be omitted, the block 406 and the block 410 may be combined, and sequence of the blocks may be re-arranged.

In the embodiment shown in FIG. 15, with the addition of the judgment regarding RMS value, the converter may select the switching between two operating frequencies according to load circumstances. For example, when the load is relatively light, the heat dissipation challenge on the converter is not serious, so no frequency switching is needed. When the load becomes heavy, the heat dissipation challenge on the converter becomes serious, and the variation amount of the chip temperature rises, at this time, the frequency switching is needed to reduce the heat dissipation challenge and the variation amount of the chip temperature.

According to an embodiment, the RMS value signal may be obtained by continuously sampling the current signals within a power frequency cycle and computing the RMS value from the sampled current signals. The RMS value signal may also be obtained by transient value of the sampling current in conjunction with present phase information, for example, the RMS value may be obtained by dividing the transient value of the sampling current by a sinusoidal value of the present current phase and then dividing the resulted value by $\sqrt{2}$. But the invention is not limited thereto.

Figure 18:
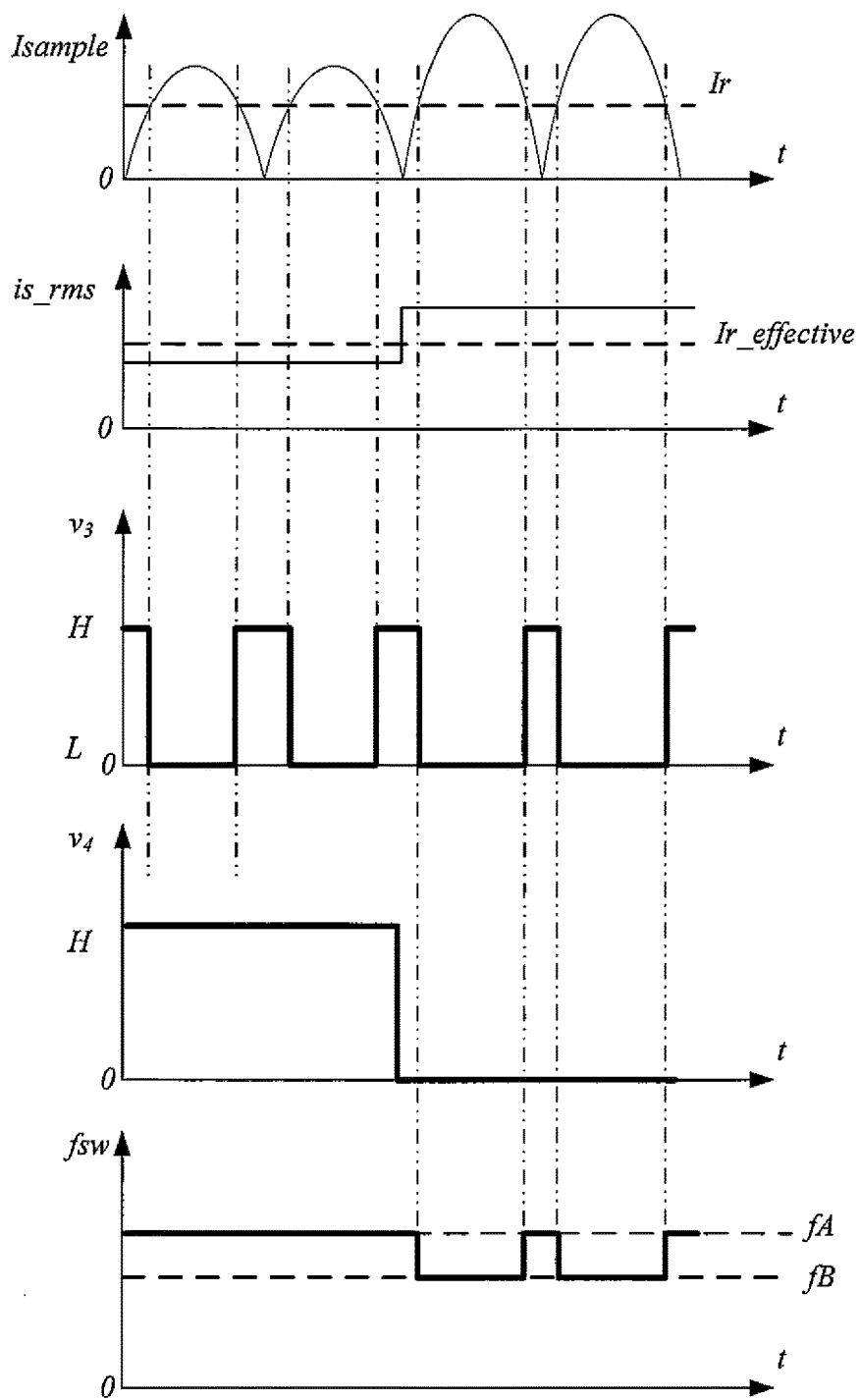
FIG. 18 shows corresponding waveforms of the converter of FIG. 15.

FIG. 18 gives corresponding waveforms of the converter shown in FIG. 15. When v4 is at a high level, the switching frequency fsw is kept at a relatively high frequency fA. When v4 is at a low level, the switching frequency fsw is controlled by v3. If v3 is at a high level, the switching frequency fsw is kept at a relatively high frequency fA. If v3 is at a low level, the switching frequency fsw is kept at a relatively low frequency fB. But the invention is not limited thereto.

For the reference current signal Ir and the RMS value reference current signal Ir_effective, many setting schemes may be employed. For example, Ir may be set as a value between 10% and 100% of a transient peak value of an input or output rated current of a corresponding converter device, and Ir_effective may be set as a value between 10% and 200% of an RMS value of an input or output rated current of the corresponding converter, and the present disclosure is not limited to the embodiments set forth herein. Further, the settings regarding the reference current signal Ir and the RMS value reference current signal Ir_effective are related to the number of times of alternation of the operating frequency of the switching device within a half of the power frequency cycle and the number of the operating frequencies. The details in fact have been described in the above embodiments, so repeated descriptions are omitted herein.

Another aspect of the present disclosure provides a method for controlling a power frequency current converter. Currents flowing through the input side or the output side of the power frequency current converter are a power frequency current. The control method may include:

controlling the power frequency current converter, to make a switching device in the converter, within a half cycle of a power frequency current, operate at at least two different fixed switching frequencies, so as to reduce junction temperature of the switching device when the switching device operates.

According to an embodiment, within a half cycle of the power frequency current: in a first section (i.e., a section when the power frequency current is relatively large, for example, the section in FIG. 10, in which Isample is larger than Ir, indicated by the arrow A), the switching device is controlled to operate at a second operating frequency (i.e., a relatively low operating frequency); and in a second section (i.e., a section when the power frequency current is relatively low, for example, the section in FIG. 10, in which Isample is smaller than or equal to Ir, indicated by the arrow B), the switching device is controlled to operate at a first operating frequency. The first operating frequency is larger than the second operating frequency, and a power frequency current in the first section at the second operating frequency is larger than a power frequency current in the second section at the first operating frequency. But the invention is not limited thereto, for example, when Isample is equal to Ir, it can be designed within the first section; hysteresis control may be applied.

Wherein, within a half cycle of the power frequency current, the switching frequency of the switching device may be controlled to go through a first alteration which is from the first operating frequency to the second operating frequency, then the switching frequency of the switching device may be controlled to go through a second alteration which is from the second operating frequency to the first operating frequency.

For detailed control method, the description regarding the embodiments in FIGS. 5-7, and 12-15 may be referred to, and repeated descriptions are omitted herein.

Although the present disclosure has been described with reference to typical embodiments, it should be understood that the terminologies herein are for illustration purposes rather than to limit the present disclosure. The present disclosure can be implemented in many specific embodiments without departing from the spirit and scope of the present disclosure, thus it shall be appreciated that the above embodiments shall not be limited to any details described above, but shall be interpreted broadly within the spirit and scope defined by the appended claims. The appended claims intend to cover all the modifications and changes falling within the scope of the appended claims and equivalents thereof.

What is claimed is:

1. A power frequency current converter, comprising:
an input side and an output side, wherein a current of the input side or the output side is a power frequency current;
a switching device;
a sampling circuit, configured to sample the power frequency current, so as to output a sampling current signal; and
a controller, configured to control the switching device to be turned on and turned off at an operating frequency, wherein, in every power frequency cycle of the power frequency current, within a half of each of the power frequency cycle, the controller generates at least two fixed-frequency control signals according to values of the sampling current signal, and the operating frequency of the switching device alters at least twice according to the at least two fixed-frequency control signals,
wherein the at least two fixed-frequency control signals comprises a first control signal and a second control signal, the frequency of the first control signal is larger than the frequency of the second control signal, and within a half of the power frequency cycle, the power frequency current of the switching device operated according to the second control signal is larger than the power frequency current of the switching device operated according to the first control signal, and
wherein the sampling current signal comprises a present value signal of a sampling current and an RMS value signal of the sampling current, and the controller further comprises:
a first judgment and comparison module, configured to receive an RMS value reference current signal and the RMS value signal of the sampling current; and
a second judgment and comparison module, configured to receive a reference current signal and the present value signal of the sampling current,
wherein, when the RMS value signal of the sampling current is larger than the RMS value reference current signal, the second judgment and comparison module compares the present value signal of the sampling current with the reference current signal.

2. The converter according to claim 1, wherein the controller outputs the first control signal and the second control signal according to a comparison result of the second judgment and comparison module.

3. The converter according to claim 1, wherein the sampling circuit further comprises:
a filter circuit, configured to filter interference signals from the sampling current signal.

4. The converter according to claim 1, wherein the sampling circuit comprises:
at least one of a current transformer, a Hall element, a sampling resistor and a Rogowski coil.

5. A method for controlling a power frequency current converter according to claim 1, comprising:
sampling the power frequency current, so as to output a sampling current signal; and
controlling the power frequency current converter, to make the switching device in the converter, in every power frequency cycle of the power frequency current, within a half cycle of each of the power frequency cycle of the power frequency current, operate under a PWM mode at least at two different fixed operating frequencies according to values of the sampling current signal,
wherein, within a half cycle of the power frequency current,
in a first section, the switching device is controlled to operate at a second operating frequency, and
in a second section, the switching device is controlled to operate at a first operating frequency,
wherein the first operating frequency is larger than the second operating frequency, and a power frequency current in the first section is larger than the power frequency current in the second section, and
wherein the sampling current signal comprises a present value signal of a sampling current and an RMS value signal of the sampling current, and the controller further:
receives an RMS value reference current signal and the RMS value signal of the sampling current; and
receives a reference current signal and the present value signal of the sampling current,
wherein, when the RMS value signal of the sampling current is larger than the RMS value reference current signal, the second judgment and comparison module compares the present value signal of the sampling current with the reference current signal.

6. The method according to claim 5, wherein, within a half cycle of the power frequency current,
the operating frequency of the switching device is controlled to go through a first alteration which is from the first operating frequency to the second operating frequency, and
the operating frequency of the switching device is controlled to go through a second alteration which is from the second operating frequency to the first operating frequency.

7. A power frequency current converter, wherein a power frequency current flows in or flows out the power frequency current converter, comprising:
a switching device;
a sampling circuit, configured to sample the power frequency current, so as to output a sampling current signal; and
a PWM controller, configured to control the switching device to be turned on and turned off with a PWM mode, wherein, in every power frequency cycle of the power frequency current, according to values of the sampling current signal, at a first stage of a half of each of the power frequency cycle of the power frequency current, the switching device operates at a first fixed frequency according to the PWM controller, and at a second stage of the half of the power frequency cycle of the power frequency current, the switching device operates at a second fixed frequency according to the PWM controller,
wherein the power frequency current at the first stage is larger than the power frequency current at the second stage, and the first fixed frequency is lower than the second fixed frequency, and
wherein the sampling current signal comprises a present value signal of a sampling current and an RMS value signal of the sampling current, and the controller further comprises:
a first judgment and comparison module, configured to receive an RMS value reference current signal and the RMS value signal of the sampling current; and a second judgment and comparison module, configured to receive a reference current signal and the present value signal of the sampling current, wherein, when the RMS value signal of the sampling current is larger than the RMS value reference current signal, the second judgment and comparison module compares the present value signal of the sampling current with the reference current signal.

\* \* \* \* \*